(12) United States Patent
Sheppard et al.

(10) Patent No.: US 7,617,111 B1
(45) Date of Patent: Nov. 10, 2009

(54) SYSTEM AND METHOD FOR PROCESSING GASOLINE PRICE DATA IN A NETWORKED ENVIRONMENT

(75) Inventors: Adam Sheppard, Seattle, WA (US); Cameron Death, Seattle, WA (US); Scott Graff, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 10/187,079

(22) Filed: Jun. 28, 2002

Related U.S. Application Data (60) Provisional application No. 60/384,254, filed on May 29, 2002.

(51) Int. Cl.
*G06Q 30/00* (2006.01)
*G06F 15/16* (2006.01)
*G06F 17/00* (2006.01)

(52) U.S. Cl. .............................. 705/1; 705/26; 709/231; 235/375

(58) Field of Classification Search ...................... 705/1, 705/26; 709/231; 235/375
See application file for complete search history.

(56) References Cited

U.S. PATENT DOCUMENTS

| | | | |
|---|---|---|---|
| 6,240,365 B1 | 5/2001 | Bunn | |
| 6,317,686 B1 | 11/2001 | Ran | |
| 6,526,335 B1 | 2/2003 | Treyz et al. | |
| 6,577,988 B1* | 6/2003 | Travagline et al. | 702/188 |
| 6,601,039 B1* | 7/2003 | Kolls | 705/14 |
| 6,629,136 B1* | 9/2003 | Naidoo | 709/219 |
| 6,965,872 B1* | 11/2005 | Grdina | 705/26 |
| 6,980,960 B2* | 12/2005 | Hajdukiewicz et al. | 705/14 |
| 2002/0013782 A1* | 1/2002 | Ostroff et al. | 707/10 |
| 2002/0190118 A1* | 12/2002 | Davenport et al. | 235/375 |
| 2003/0216971 A1* | 11/2003 | Sick et al. | 705/26 |
| 2007/0100728 A1* | 5/2007 | Rotman et al. | 705/36 R |

OTHER PUBLICATIONS

Florida State Gas Prices website, htpp://web.archive.org/web/20020222122051/http://www.floridastategasprices.com/, Feb. 22, 2002.*

* cited by examiner

*Primary Examiner*—John W Hayes
*Assistant Examiner*—Fadey S Jabr
(74) *Attorney, Agent, or Firm*—Senniger Powers LLP (57) ABSTRACT

A system and method for processing gasoline price data in a networked environment are provided. A traffic data processing server obtains gasoline price data indicative of user purchases. The gasoline price data is associated with a service provider location and product identifier. A gasoline price processing server processes the incoming gasoline price data to generate geographic-based gasoline price statistical information. Upon obtain a client computer request for a geographic area, the gasoline price processing server transmits display information including the geographic-based statistical gasoline price information.

24 Claims, 10 Drawing Sheets

SYSTEM AND METHOD FOR PROCESSING GASOLINE PRICE DATA IN A NETWORKED ENVIRONMENT

CROSS-REFERENCE TO RELATED APPLICATION

This application claims the benefit of U.S. Provisional Application 60/384,254, entitled SYSTEM AND METHOD FOR PROCESSING GASOLINE PRICE DATA IN A NETWORKED ENVIRONMENT, and filed on May 29, 2002. U.S. Provisional Application No. 60/384,254 is incorporated by reference herein.

FIELD OF THE INVENTION

In general, the present invention relates to computer software and computer communication networks, and in particular, to a system and method for processing and distributing gasoline price data in a networked environment according to geographic location.

BACKGROUND OF THE INVENTION

Generally described, computing devices, such as personal computers, and computer communication networks may be utilized to obtain and distribute a variety of information. In one widely utilized embodiment, a user may access a computing device having a communication software application that allows the user to transmit textual and graphical messages, often referred to as electronic mail or e-mail, to other users connected to the network. In accordance with this embodiment, the user may direct messages to specific users that are identified by a logical address within the network. In another widely utilize embodiment, a user may access a computing device having a software application that communicates via a global network, such as the Internet, to access information provided by other computing devices connected to the global network. In accordance with this embodiment, computer users can access the network to obtain general information regarding a topic by requesting the information from the appropriate source. Additionally, the users can access customized information by including personal information with a request to the external source.

Many external information sources specialize in offering user information that may be of a dynamic nature and of value to other users. In one embodiment, a group of computing device users may share gasoline price information by exchanging electronic mail messages with one another identifying current gasoline price information. However, this approach can become very limited in that user's reporting is often inaccurate or unverifiable and the coverage area of the data is limited to the number of users involved. Moreover, this approach is also inefficient in its ability to widely disseminate the information to a number of users.

In another typical embodiment, a service provider may provide gasoline price information to users on a global network, such as the Internet. In accordance with this embodiment, gasoline price data is collected by users and submitted to the service provider. In turn, the service provider makes the gasoline price information available to computer users requesting the information over the global network. Although this approach may facilitate wider distribution of the information, it remains deficient in that the gasoline price information depends on user input, which may be unreliable. Additionally, the user input may be varied such that the gasoline price information cannot be predictably updated. Still further, because user input cannot be guaranteed, the system cannot accurately calculate statistical information, such as average gasoline price for a geographic area, lowest gasoline price in a geographic area, highest gasoline price in a geographic area, and the like.

Thus, there is a need for a system and method for processing and distributing geographic location-based gasoline price information, including statistical gasoline price information, via a communication network.

SUMMARY OF THE INVENTION

A system and method for processing gasoline price data in a networked environment are provided. A gasoline price processing server obtains gasoline price data indicative of user purchases. The gasoline price data is associated with a service provider location and product identifier. A gasoline price processing server processes the incoming gasoline price data to generate geographic-based gasoline price statistical information. Upon obtaining a client computer request for a geographic area, the gasoline price processing server transmits display information including the geographic-based statistical gasoline price information.

In accordance with an embodiment of the present invention, a method for processing gasoline price data is provided. A gasoline price processing computing device obtains transaction data including data indicative of a purchase of gasoline from an identifiable location. The gasoline price processing computing device processes the transaction data according to geographic criteria and obtains a user request for gasoline price data. The user request includes a selection of a geographic region. The gasoline price processing computing device generates a display including the processed transaction data for the specified geographic region and transmits the display to the user.

In accordance with another embodiment of the present invention, a computer-readable medium having computer-executable components for processing gasoline price information is provided. The computer-executable components include a data source component operable to obtain transaction data indicative of a purchase of gasoline from an identifiable location. The computer-executable components also include a user interface component operable to obtain a user request for gasoline price data corresponding to an identifiable location. The computer-executable components further include a processing component operable to process the transaction data according to geographic criteria and to generate a display including the processed transaction data. Additionally, the user interface component is further operable to transmit the display including the processed transaction data to the user.

In accordance with a further embodiment of the present invention, a method for processing gasoline price data is provided. The method may be implemented in a computer system having a display and a user interface selection device. In accordance with the method, a gasoline price processing computing device obtains transaction data including data indicative of a purchase of gasoline from a service provider. The gasoline price processing computing device obtains a user request for gasoline price data. The user request includes a specification of a geographic region. The gasoline price processing computing device generates a map illustrative of the specified geographic region on the display and visual indicators indicative of at least one gasoline service station located within the specified geographic region on the display and corresponding to the transaction data. The gasoline price processing computing device also generates data indicative of gasoline price data corresponding to the transaction data for the at least one gasoline service station on the display.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 9:
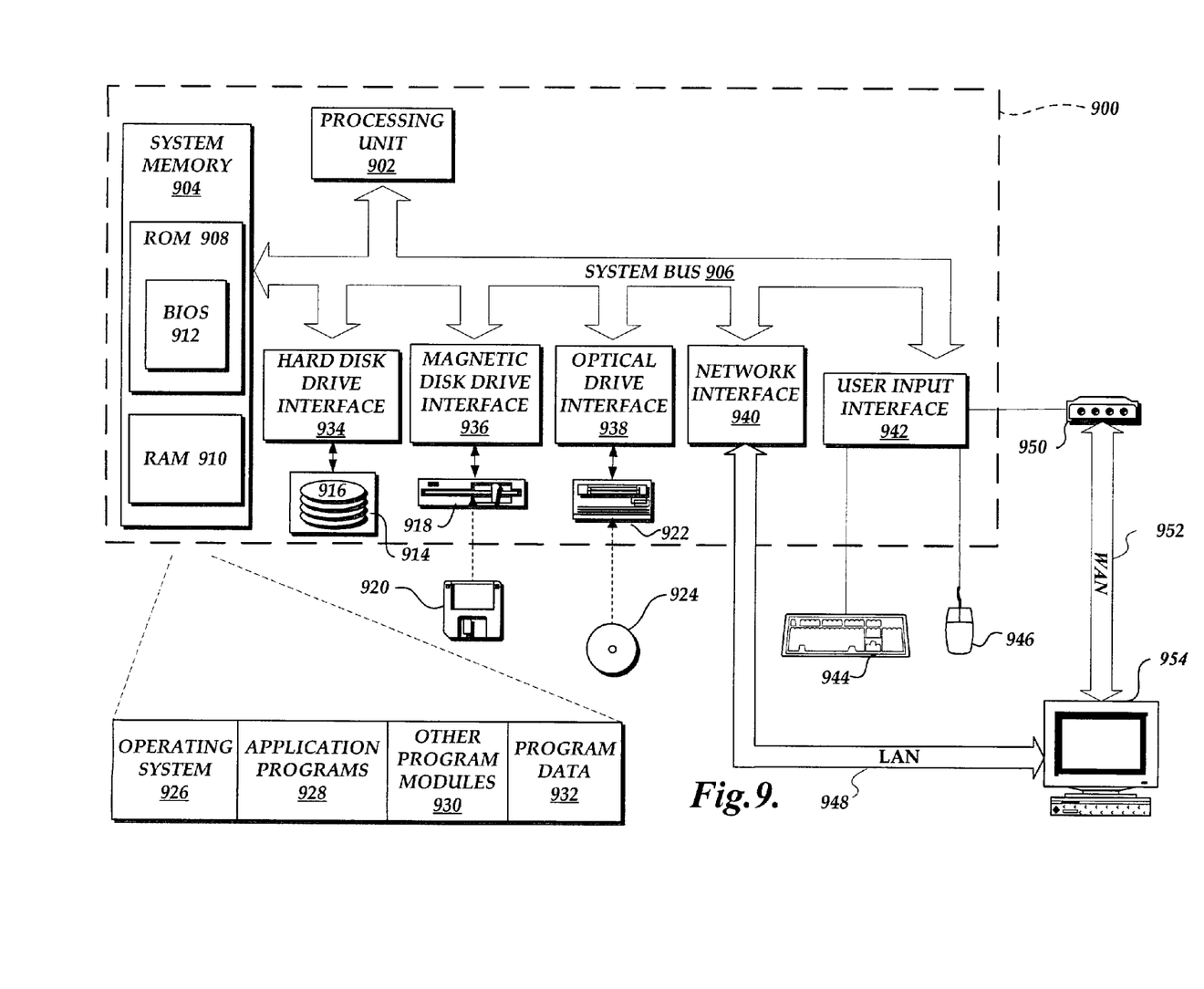
FIG. 9 is a block diagram of a computing system environment suitable for implementing one or more aspects of the present invention.

FIG. 9 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, or distributed computing environments that include any of the above systems or the like.

The invention may be described in the general context of computer-executable instructions, such as program modules, being executed by a computer. Generally, program modules include routines, programs, objects, components, data structures, etc., that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 900. Components of a computer 900 include, but are not limited to, a processing unit 902, a system memory 904, and a system bus 906 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 900 typically includes a variety of computer-readable media. Computer-readable media can be any available media that can be accessed by the computer 900 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 900.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 904 includes computer storage media in the form of volatile and/or non-volatile memory such as read only memory (ROM) 908 and random access memory (RAM) 910. A basic input/output system 912 (BIOS), containing the basic routines that help to transfer information between elements within the computer 900, such as during start-up, is typically stored in ROM 908. RAM 910 typically contains data and/or program modules that are immediately accessible to and/or presently being operated on by the processing unit 902. By way of example, and not limitation, FIG.

9 illustrates an operating system 926, application programs 928, other program modules 930, and program data 932.

The computer 900 may also include removable/non-removable, volatile/non-volatile computer storage media. By way of example only, FIG. 9 illustrates a hard disk drive 914 that reads from or writes to non-removable, non-volatile magnetic media 916, a magnetic drive 918 that reads from or writes to a removable, non-volatile magnetic disk 920, and an optical disk drive 922 that reads from or writes to a removable, non-volatile optical disk 924, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 914, magnetic disk drive 918, and optical disk drive 922 may be connected to the system bus 906 by a hard disk drive interface 934, a magnetic disk drive interface 936, and an optical drive interface 938, respectively. Alternatively, the hard disk drive 914, magnetic disk drive 918, and optical disk drive 922 are typically connected to the system bus 906 by a Small Computer System Interface (SCSI).

The drives and their associated computer storage media discussed above and illustrated in FIG. 9, provide storage of computer-readable instructions, data structures, program modules and other data for the computer 900. In FIG. 9, for example, the hard disk drive 934 is illustrated as storing the operating system 926, application programs 928, other programs 930, and program data 932. Note that these components can either be the same as or different from the operating system 926, the other program modules 930, and the program data 932. A user may enter commands and information into the computer 900 through an input device such as a keyboard 944 and/or a pointing device 946, commonly referred to as a mouse, track ball or touch pad. Other input devices (not shown) may include a microphone, a joystick, a game pad, a satellite dish, a scanner, or the like. These and other input devices are often connected to the processing unit 902 through user input interface 942 and may be connected by other interface and bus structures, such as a parallel port, game port or other universal serial bus (USB).

The computer 900 may operate in a network environment using logical connections to one or more remote computers 954. The remote computer 954 may be a personal computer, a server, a router, a network PC, a peer device or other common network node, and typically includes many or all of the elements described above relative to the computer 900, although only a memory storage device has been illustrated in FIG. 9. The logical connections depicted in FIG. 9 include a local area network (LAN) 948 and a wide area network (WAN) 952, but also include other networks. Such network environments are commonplace in office, enterprise-wide computer networks, Intranets, and the Internet.

When used in a LAN network environment, the computer 900 is connected to the LAN 948 through a network interface adapter 940. When used in a WAN network environment, the computer typically includes a modem 950 or other means for establishing communications over the WAN 952, such as the Internet. The modem, which may be internal or external, may be connected to the system bus 906 via the serial port interface or other appropriate mechanism. In a networked environment, program modules depicted relative to the computer 900, or portions thereof, may be stored in the remote memory storage device. By way of example, and not limitation, FIG. 9 illustrates remote application programs 928 as residing on memory device 904. It will be appreciated that the network connections shown are exemplary and other means of establishing communication between the computers may be used. Although many other internal components of the computer 900 are not shown, those of ordinary skill will appreciate that such components and their interconnection are well known. Accordingly, additional details concerning the internal construction of the computer 900 need not be disclosed in connection with the present invention.

Those skilled in the art will understand that program modules such as the operating system 926, the application programs 928 and data 932 are provided to the computer 900 via one of its memory storage devices, which may include ROM 908, RAM 910, hard disk drive 914, magnetic disk drive 918, or optical disk device 922. The hard disk drive 914 is used to store data 932 and the programs, including the operating system 926 and application programs 928.

When the computer 900 is turned on or reset, the BIOS 912, which is stored in ROM 908 instructs the processing unit 902 to load the operating system 926 from the hard disk drive 914 into the RAM 910. Once the operating system 926 is loaded into RAM 910, the processing unit executes the operating system code and causes the visual elements associated with the user interface of the operating system to be displayed on the monitor. When a user opens an application program 928, the program code and relevant data are read from the hard disk drive and stored in RAM 910.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communication device, modem and temporary telephone, or a wireless link. The Internet has recently seen explosive growth by virtue of its ability to link computers located throughout the world. As the Internet has grown, so has the WWW.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by an number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer®, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

Generally described, the present invention relates to a system and method for processing gasoline price information in a networked environment. More specifically, the present invention relates to the processing of gasoline price data for a defined geographic region and generating user displays according to a selected geographic region. In one illustrative embodiment of the present invention, the present invention relates to a system and method for processing and distributing updated gasoline price information to users in a distributed networked environment. In another illustrative embodiment of the present invention, a system and method for processing and distributing gasoline price information to users in an integrated networked embodiment is provided. Although the present invention will be described in regards to both an integrated network environment and distributed computing environment, one skilled in the relevant art will appreciate that the disclosed embodiments should not be construed as limiting.

Figure 1:
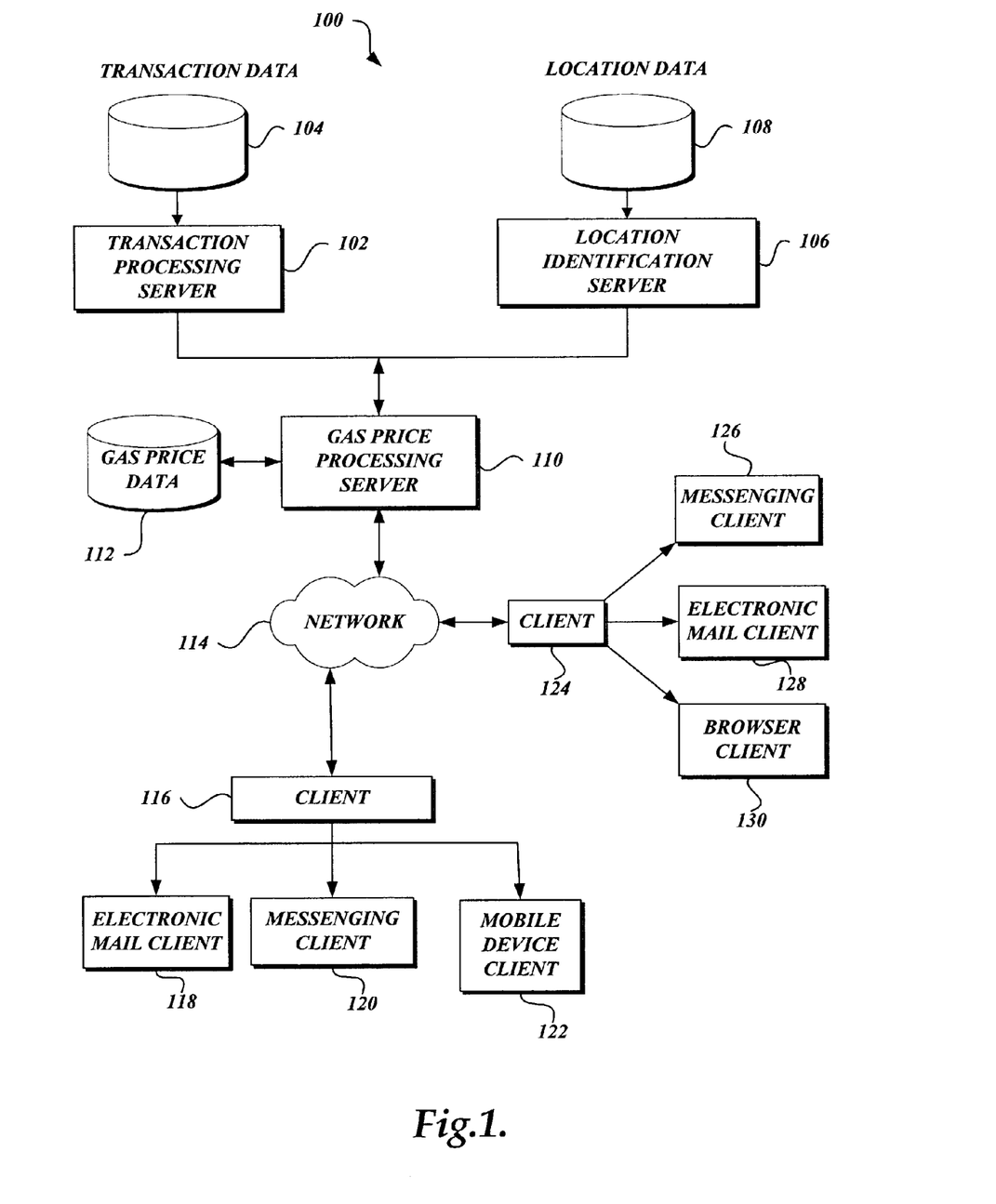
FIG. 1 is a block diagram illustrative of a gasoline price processing system including a traffic incident transaction processing server, a gasoline price processing server, a location identification server, and a number of user computing device in accordance with the present invention.

With reference to FIG. 1, an illustrative gasoline price processing system 100 will be described. The gasoline price processing system 100 includes a transaction processing server 102. The transaction processing server 102 includes a transaction data database 104 that stores transaction data corresponding to purchases of gasoline from gasoline service providers. In an illustrative embodiment of the present invention, the transaction data can be obtained from gasoline purchases utilizing consumer credit purchases of gasoline. The transaction processing server 102 may obtain data from a number of sources, including the gasoline service stations and/or any number of consumer credit companies, such as banks. The transaction processing server 102 may be provided by an external data source independent of the other components in the gasoline price processing 100, or alternatively, integrated with other components of the gasoline price processing system.

The gasoline price processing system 100 also includes a location identification server 106 for operable to obtain location information, such as address information, and to return latitudinal and longitudinal information corresponding to the location information. Additionally, the location identification server 106 may be further operable to generate an error signal in the event location information cannot be associated with latitudinal and longitudinal information. The location identification server 106 can reference and store information in a location information database 108. In an illustrative embodiment of the present invention, the location identification server 106 may be offered as a component for returning latitudinal and longitudinal information for any number of other components in a distributed network. Alternatively, the location identification server 106 may be maintained as a component solely for the gasoline price processing system.

The gasoline price processing system 100 further includes a gasoline price processing server 110 operable to obtain the transaction data from the transaction processing server 102 and the location information from the location identification server 106. Further, the gasoline processing server 110 is also operable to obtain user requests for gasoline price data and process the request. In an illustrative embodiment of the present invention, the gasoline price processing server 110 processes the transaction data according to geographic criteria and stores the processed transaction data in a gasoline price database 112. The processing of the transaction data will be described in greater detail below.

The gasoline price processing system 100 can still further include a number of clients connected in communication with the gasoline price processing server 110. In an illustrative embodiment of the present invention, a client can be associated with a number of communication devices operable to request and receive gasoline price data via a variety of communication and display formats. For example, client 116 may be associated with an electronic mail client 118 operable to receive textual and graphical electronic mail messages, a messaging client 120 operable to receive textual and graphical messages via an instant messaging client and a mobile device client 122 operable to receive audio messages. On the other hand, client 124 may be associated with a messaging client 126, an electronic mail client 128, and a browser application client 130. In an illustrative embodiment, the client devices 118, 120 122, 126, 128, and 130 can be hosted by separate client computing devices or in a single computing device as specified by the individual client.

As illustrated in FIG. 1, the components of the gasoline price processing system 100 may communicate via a global network 114, such as the Internet. Additionally, some or all of the components may also utilize private or semi-private networks to communicate.

In accordance with an embodiment of the present invention, the transaction processing server 102 obtains transaction data indicative of consumer purchases at a gasoline service provider in the form of consumer credit purchases from any number of consumer credit agencies. The transaction processing server processes the credit purchase data and forwards the processed data to the gasoline price processing server 110. In an illustrative embodiment of the present invention, the processed transaction data includes an identification of the location of the gasoline service provider, a date of the transaction, the type of gasoline product purchased and the price for the particular type of gasoline product.

The gasoline price processing server 110 obtains the transaction data and processes the transaction data according to geographic criteria, such as postal zip code, metro area and/or metro region. In an illustrative embodiment of the present invention, the gasoline price processing server 110 can calculate average gasoline price for a given geographic area, identify lowest and highest gasoline price, and any number of additional statistical processes. The gasoline price processing server 110 also associates latitudinal and longitudinal coordinates for the transaction data by obtaining coordinate data from the location identification server 106. Thereafter, the gasoline price processing server 110 obtains client requests for gasoline price data for an identifiable geographic location. The gasoline price processing server 100 can transmit the processed transaction data, such as average prices, lowest and highest prices, for the requested geographic location and/or deliver detailed information regarding pricing for service providers within the geographic location.

Figure 2:
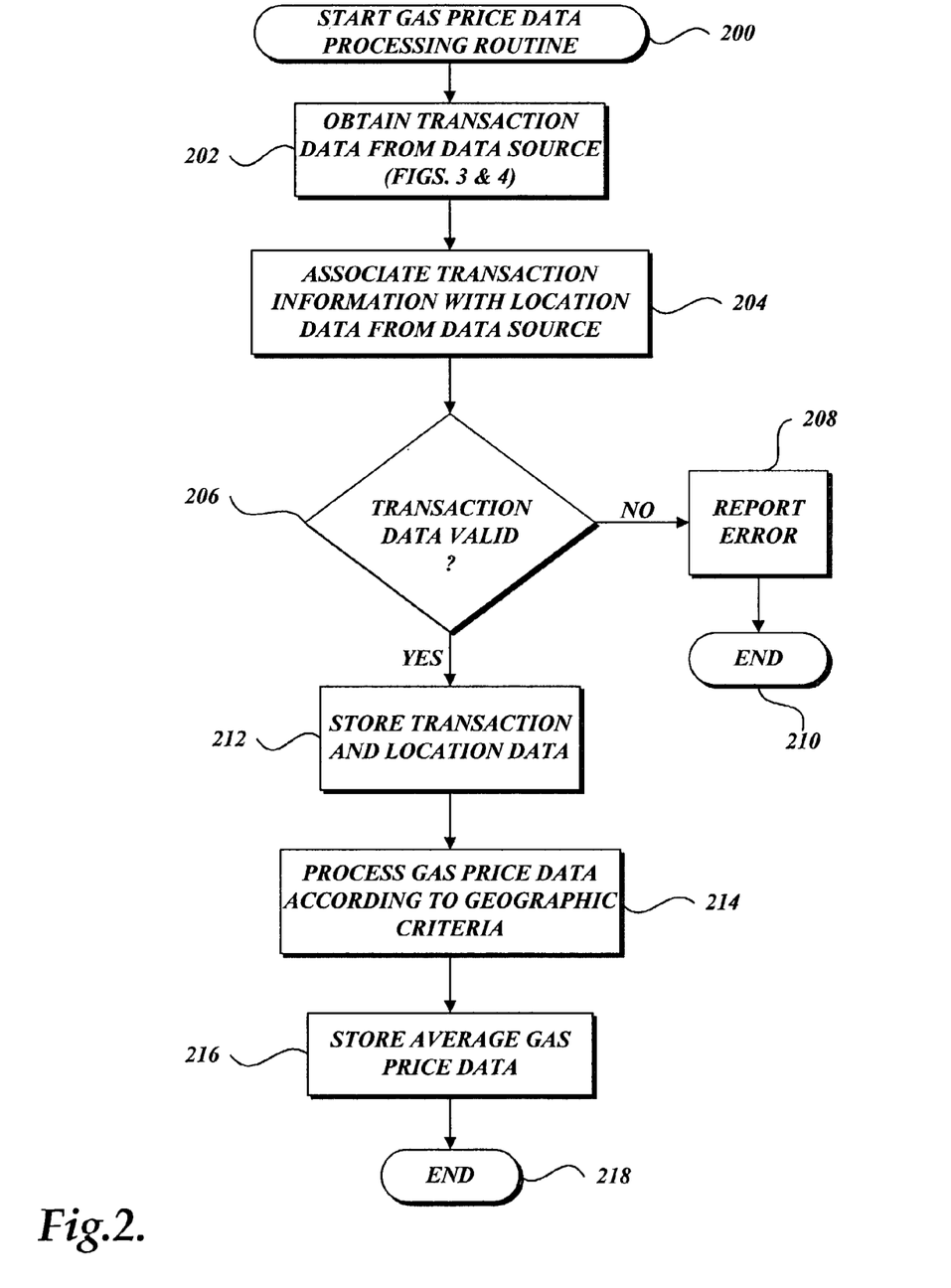
FIG. 2 is a flow diagram of a gasoline price data processing routine implemented by a gasoline price processing server in accordance with the present invention.

FIG. 2 is a flow diagram illustrative of a gasoline price data processing routine 200 implemented by the gasoline price processing server 110 in accordance with the present invention. At block 202, the gasoline price processing server 110 obtains transaction data from the transaction processing server 102. In an illustrative embodiment of the present invention, the transaction processing server 102 may transmit transaction data to the gasoline price processing server 110 as a batch process at scheduled intervals. Alternatively, the transaction processing server 102 may transmit the transaction data as the data is obtained.

Figure 3:
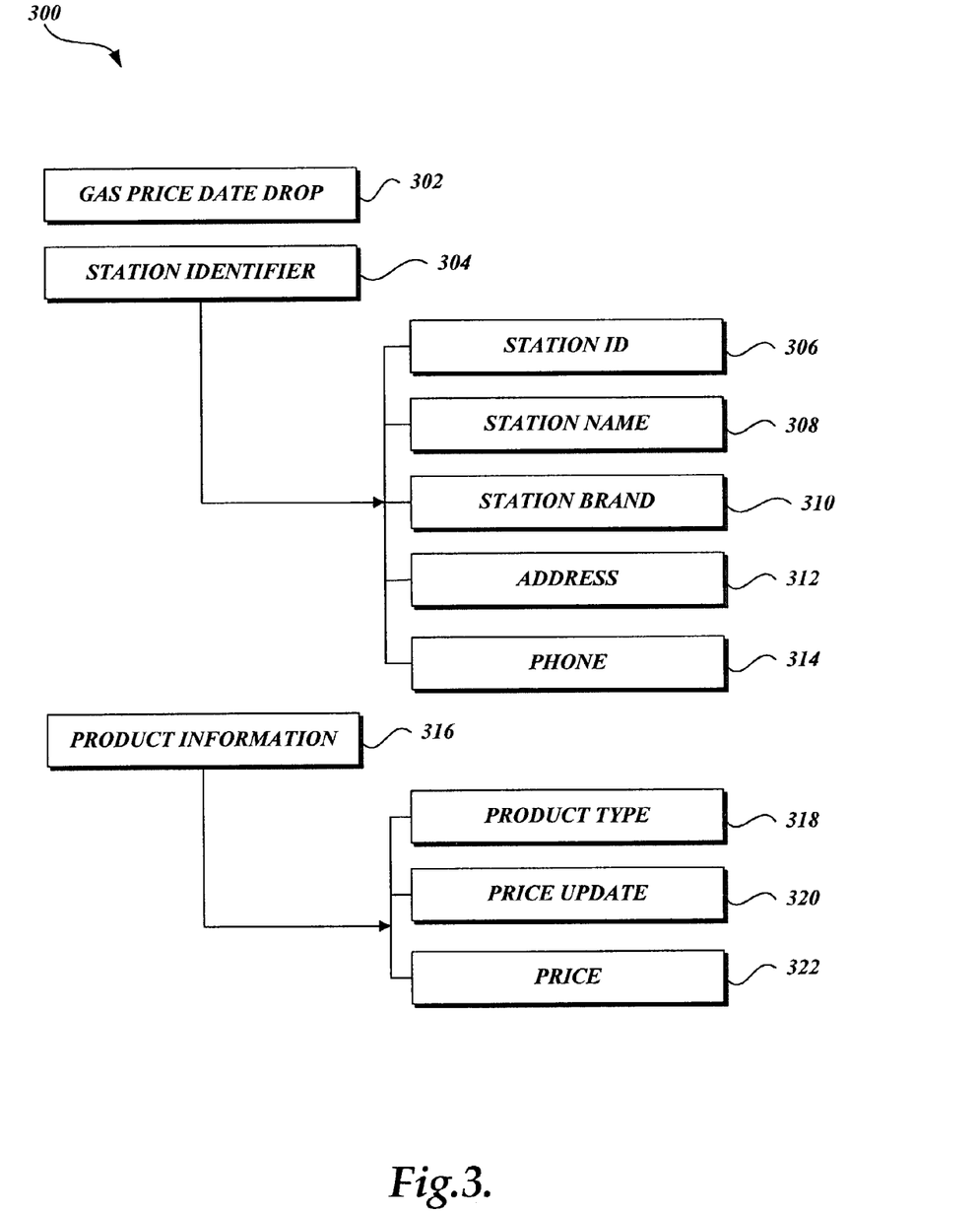
FIG. 3 is a block diagram of a gasoline price data format utilized by a gasoline price processing system to obtain gasoline price data in accordance with the present invention.

FIG. 3 is a block diagram of a data format 300 of a transaction data structure utilized by the gasoline price processing system 100 in accordance with the present invention. In an illustrative embodiment of the present invention, the data format 300 can correspond to an XML-based data definition, such as an XML schema, that allows components of the gasoline price processing system 100 to transmit data according to the definitions. However, one skilled in the relevant art will appreciate that the data format may be embodied in a different data format in accordance with the present invention. Further, one skilled in the relevant art will appreciate that the data format 300 is illustrative in nature and that alternative or modified data formats may also be practiced with the present invention.

In an illustrative embodiment of the present invention, data streams from the transaction processing server corresponding to the data format 300 include a gasoline price data drop category 302 for identifying the date of the transmission of the transaction data. In an illustrative embodiment of the present invention, the gasoline price data drop category 302 may correspond to a batched data transaction such that the date may apply to any number of gasoline service stations providing transaction data in the data stream. In turn, each gasoline service station may also be associated with multiple price data, as will be described in greater detail below.

To transmit individual transaction, the data format 300 also includes one or more station identifiers 304 for identifying the gasoline service stations from which the individual gasoline price data was collected. Because transaction data may be collected from a number of gasoline service stations, a transaction data stream may have one or more instances of a station identifier category object, each station identifier category object associated with any number of instances of gasoline transaction objects that will be described below. Each station identifier category 304 may be associated with a number of attributes. In an illustrative embodiment of the present invention, a station identifier category 304 can include a station id attribute 306 that corresponds to a unique identifier assigned by the gasoline price processing system 100. The station identifier category 304 can also include a station name attribute 308 that corresponds to an identifiable name of the service station and a station brand attribute 310 that corresponds to the brand, or brands, of gasoline that the station sells. The station identifier category 304 can also include a station address attribute 312 and a station phone number 314 that are operable to identify the location and contact information for the particular service provider. In an illustrative embodiment of the present invention, the address attribute 314 may be in the form of a textual street address or alternatively, in longitudinal and latitudinal coordinates.

With continued reference to FIG. 3, each station identifier category can be associated with any number of product information objects corresponding to the product information category 316. Each product information object corresponds to gasoline sales data for a given time period. The gasoline sales data may be from individual sales or from a number of sales. Similar to the station identifier category 304, the product information category 316 can be associated with a number of attributes. The product information category 316 can include a product type attribute 318 for specifying a gasoline product type. In an illustrative embodiment of the present invention, the gasoline product types may be set by common industry terms, e.g., regular unleaded, premium unleaded, etc. or by qualities of the gasoline product, e.g., octane ratings. The product type attribute 316 can also include a price update attribute 320 for identifying the particular data on which the product information was generated. Additionally, the product information category 316 can include a price attribute 322 for identifying the price associate with the previously define product type and price update attributes 318, 320.

Figure 4:
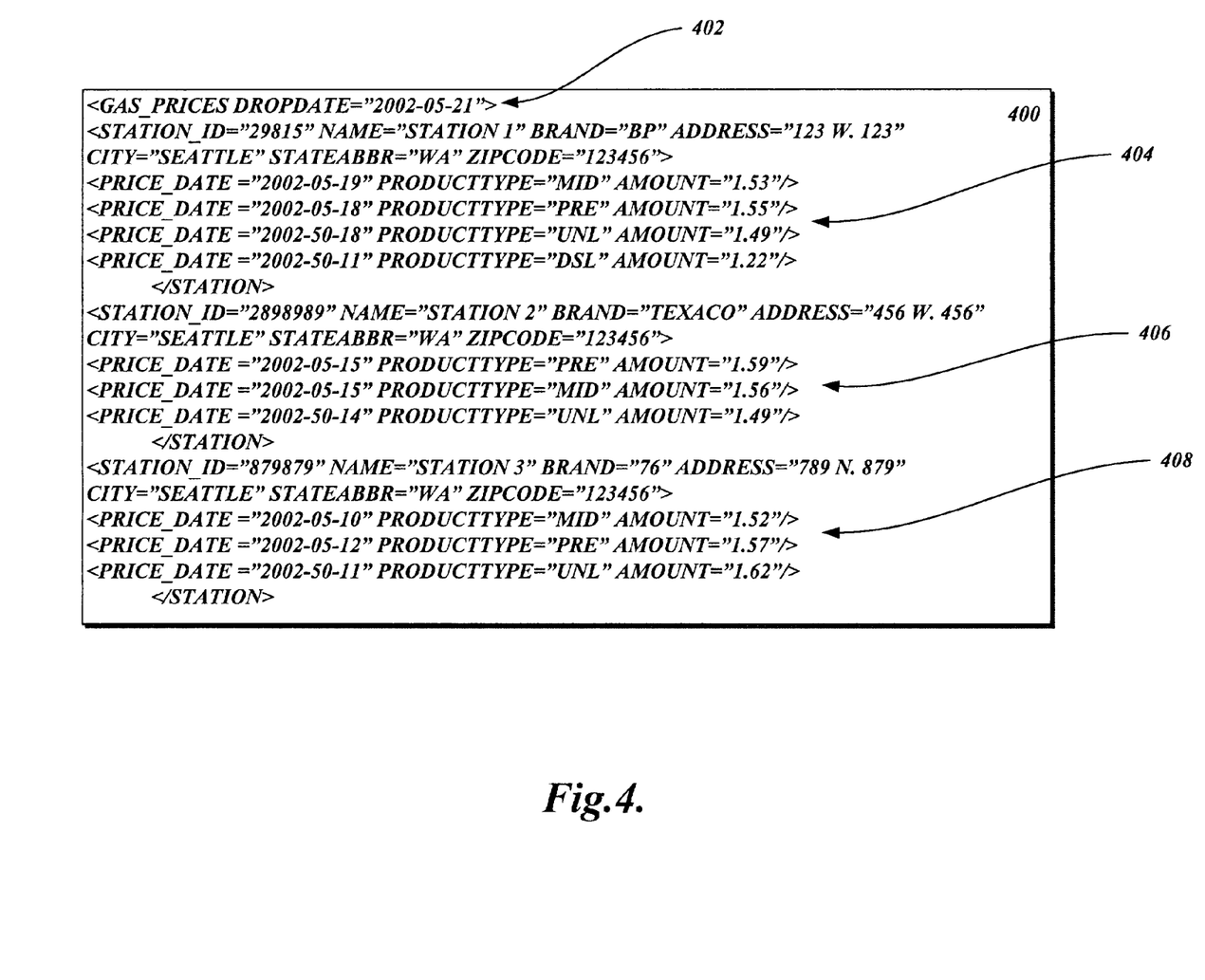
FIG. 4 is a block diagram of XML instance data corresponding to the data format of FIG. 3 and utilized by a gasoline price processing system in accordance by the present invention.

FIG. 4 is a block diagram of XML instance data 400 corresponding to the data format 300 of FIG. 3 and utilized by the gasoline price processing system 100 in accordance by the present invention. In accordance with the data format 300 (FIG. 3), the XML instance data 400 includes a first section 402 instantiating a date for the gasoline data drop category 302. Further, the XML instance data 400 includes three additional sections 404, 406, and 410 instantiating attribute values for three gasoline service stations. Each section, 404, 406, and 408, includes a number of XML instance data defining attribute values for the product information category 316. As illustrated in FIG. 4, the attribute values for the product information category 316 do not have to be identical.

Returning to FIG. 2, at block 204, the gasoline price processing server 110 associates the location data to the transaction data. As described above with regard to FIGS. 3 and 4, the transaction data is typically associated with a street address for the gasoline service station. To facilitate the generation of a visual display highlighting the location of the gasoline service station, the gasoline price processing server 110 may transform the street address information to latitudinal and longitudinal coordinates. In an illustrative embodiment of the present invention, the gasoline price processing server 110 transmits the address information to the location identification server 106. In one embodiment, the location identification server 106 can return latitudinal and longitudinal corresponding to the address information. Additionally, if the address information does not correspond to latitudinal or longitudinal coordinates, such as a non-existent location, the location identification server 106 can return an error message. In another embodiment, the location identification server 106 may return a graphical map including a representative geographic region and an embedded visual representation of the gasoline service station corresponding to the address information.

At decision block 206, a test is conducted to determine whether the address information in the transaction data is valid. If the address information is not valid, at block 208, the gasoline price processing server 110 reports an error. Additionally, the gasoline price processing server 110 can remove the error data from further processing and may send an error report to the transaction processing server 102. Alternatively, if the address information in the transaction data is valid, at block 212, the gasoline price processing server 110 stores the transaction and location data in the gasoline price data database 112.

At block 214, the gasoline price processing server 110 processes gasoline price data for given geographic criteria. In an illustrative embodiment of the present invention, the gasoline price processing server 110 can calculate an average gasoline price for a given geographic area. The average price calculation may be for all gasoline purchases within the geographic area. Alternatively, the average price calculation may be further organized according gasoline product type, e.g., regular unleaded vs. premium unleaded. In another embodiment of the present invention, the gasoline price processing server 110 may also identify the lowest gasoline price for the geographic area and the highest gasoline price for the geographic area. One skilled in the relevant art will appreciate that the geographic area may correspond to postal zip code, identifiable metro areas, and/or customizable geographic boundaries definable by a system administrator and/or by individual users. Additionally, in another embodiment of the present invention, the gasoline price processing server 110 may calculate average prices and/or identify high and low prices for multiple geographic criteria. For example, the gasoline price processing server 110 may also calculate an average price for an entire state. One skilled in the relevant art will appreciate that additional statistical processes, including interpolative processing, may also be utilized in accordance with the present invention.

At block 216, the gasoline price processing server 110 stores the processed gasoline data in the gasoline price database 112. In an illustrative embodiment of the present invention, the gasoline price processing server 110 may store the processed data according to the geographic criteria utilized to process the data for later retrieval. At block 218, the routine 200 terminates.

Figure 5:
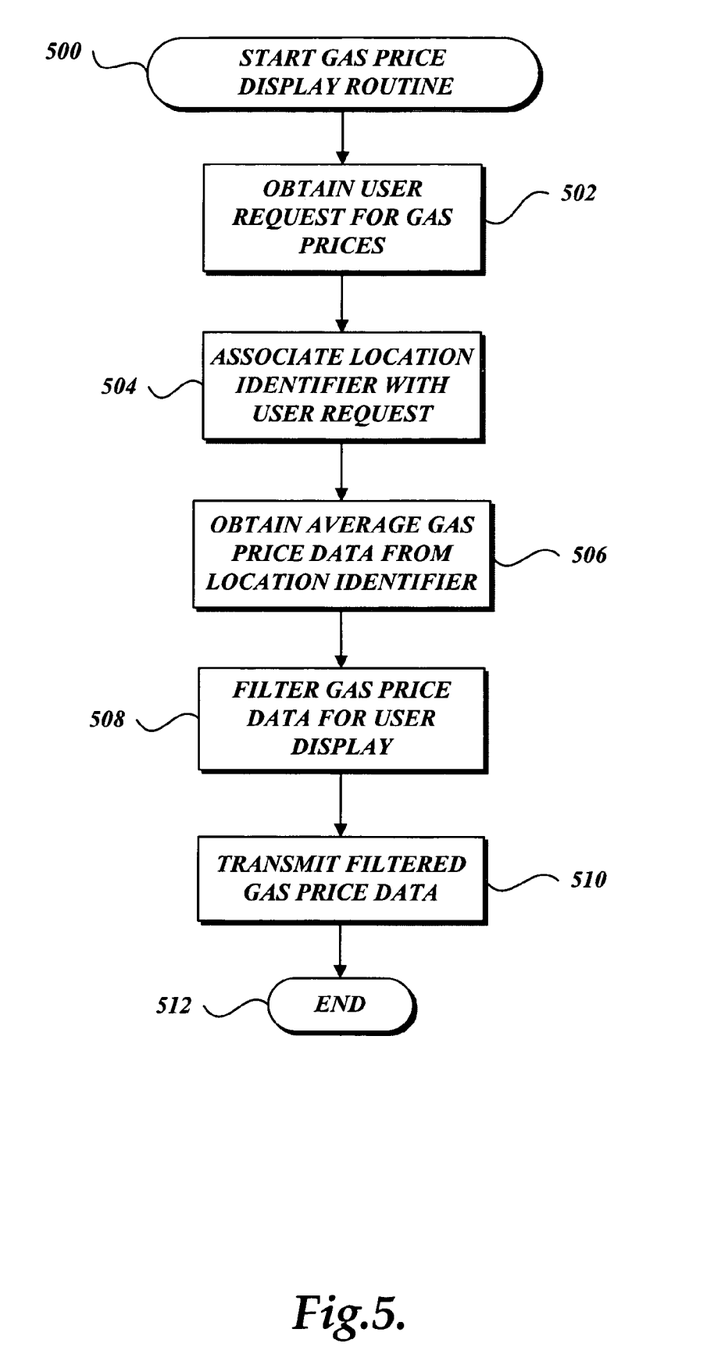
FIG. 5 is a flow diagram illustrative of a routine for displaying gasoline price data implemented by a gasoline price data processing server in accordance with the present invention.

With reference now to FIG. 5, a display routine 500 implemented by the gasoline price processing server 110 to generate gasoline price data displays for clients will be described. At block 502, the gasoline price processing server 110 obtains a user request for gasoline price data. In an illustrative embodiment of the present invention, the user request for the gasoline price data may be transmitted via a variety of client devices, such as mobile client, messaging clients, electronic mail clients, via the network 114. In another illustrative embodiment of the present invention, a device associated with a user may periodically transmit a request for gasoline price data. For example, a mobile device may periodically transmit a request for gasoline price. In a further illustrative embodiment of the present invention, a device associated with a user may also be prompted to request gasoline price data based up a processing of external data inputs. For example, a computing device may be in communication with one or more sensors in an automobile, or other gasoline powered vehicle, that transmit gasoline tank levels to a computing device. Accordingly, the computing device may automatically transmit a request for gasoline price data once the gasoline level has reached a minimum threshold. In still another illustrative embodiment of the present invention, the user request may originate from another application program, such as mapping application program, requesting average gasoline price data for defined navigable route.

At block 504, the gasoline price processing server 110 associates a location identifier with the user request. In an illustrative embodiment of the present invention, the user request can include a specification of a particular geographic region of interest. For example, the user request may include a particular postal zip code of interest. The gasoline processing server 100 can utilize a default proximity radius to identify gasoline service stations that are located in proximity to the center of the area corresponding to the specified postal zip code. Alternatively, the user request can include a radius specification that allows a user to specify a proximity radius or select from a number of possible proximity radiuses. In another embodiment of the present invention, a computing device may calculate and transmit a user's location at the time the gasoline price data request, such as by using a global positioning system ("GPS") component or other location calculating components. In still a further embodiment of the present invention, a user may have a set of pre-established configurations that specify a geographic area and/or proximity radius that can be selected by the user. In still another embodiment of the present invention, a user request gasoline price data from a navigable route, such as through a graphical outline or other interface, that does not include a specific selection of a geographic region. In accordance with this embodiment, the gasoline price processing server 110 can determine geographic areas of interest corresponding to the navigable route.

In addition to the specification of a desired geographic area, the user request can include information utilized to personalize the processing of the request. For example, the user request can include an identification of a particular type of display device to be generated and any additional filtering/processing information. Alternatively, the user request can include a user identifier that allows the gasoline price processing server 110 to retrieve the processing criteria from a previously store user profile. Still further, the gasoline price processing server 110 may also utilize the location identification server 106 to transform location information into a more suitable format.

At block 506, the gasoline price processing server 110 obtains the processed gasoline price information from the gasoline price database 112 corresponding to the user request. As described above, the gasoline price processing server 110 can return all data matching the geographic criteria of the user request. Alternatively, the gasoline price processing server 110 may select only those gasoline service stations that are located within the proximity radius. Still further, if the geographic criteria encompass multiple geographic areas, the gasoline price processing server 110 may first process each of the geographic criteria separately to generate subsets of data matching individual criteria. The gasoline price processing server 110 can then apply logical rules to the individual results to generate a cumulative subset of data combining the individual subsets. For example, the gasoline price processing server 110 may utilize an OR operator to inclusively process multiple subsets of data.

At block 508, the gasoline price processing server 110 filters the gasoline price information according to one or more user preferences. For example, the gasoline price processing server 110 may exclude gasoline data from a particular gasoline service station. Alternatively, the gasoline price processing server 110 may exclude a particular product of gasoline, e.g., diesel, from the gasoline price data. Further, the gasoline price processing server 110 may organize the gasoline price data according to filtering data. For example, a user may specify an order for particular gasoline service stations. Likewise, a system administrator may control the organization of the gasoline price data according to financial advertising data. Still further, the gasoline price processing server 110 may filter the gasoline price data covering multiple geographic areas according to a determined average gasoline price. For example, for data processing encompassing multiple navigable routes over multiple geographic areas, the gasoline price processing server 110 may incrementally sort the various route data according to average gasoline price for each route. At block 510, the gasoline price processing server 110 transmits the filtered gasoline price data to the requesting user. At block 512, the routine 500 terminates.

Figure 6:
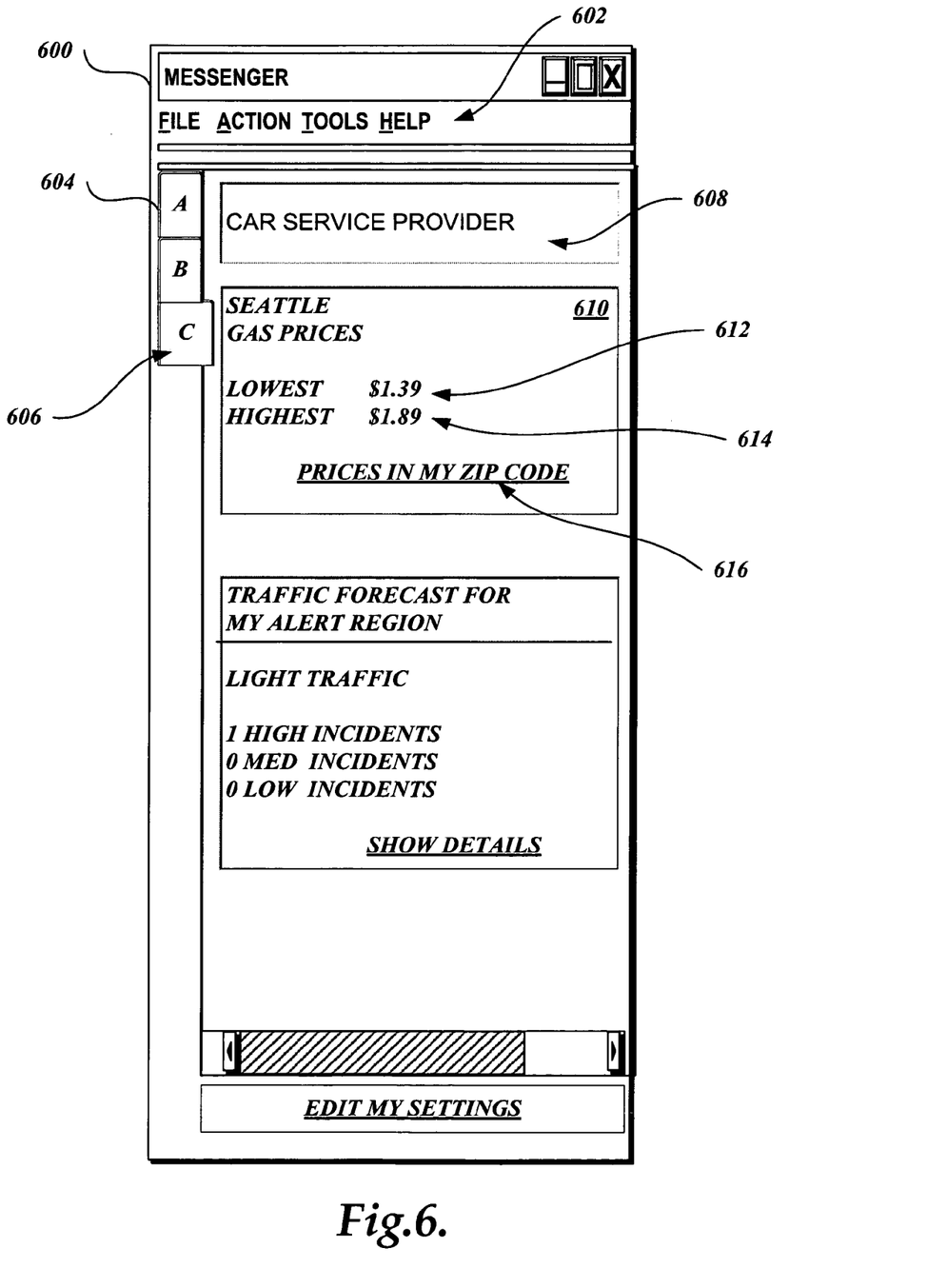
FIG. 6 is a block diagram illustrative of an exemplary screen display generated by a client computing device corresponding a geographic location-based gasoline price data display user interface formed in accordance with the present invention.

FIG. 6 is a block diagram illustrative of a screen display 600 generated by the gasoline price processing server 110 for display on a user device, such as a messaging client 120, in accordance with the present invention. One skilled in the relevant art will appreciate that the screen display 600 is illustrative in nature and alternative screen displays may also be utilized in accordance with the present invention. Further, the screen display 600 may also be utilized in conjunction with other client devices. The screen display 600 includes a menu bar 602 operable to allow the user various file-related options, such as saving, printing, and the like. The screen display further includes a number of tabs 604 indicative of several messaging displays available to the user, including a tab 606 related to gasoline price data. The screen display 600 further includes an identification portion 608 for identifying the service providing the gasoline price data.

The screen display 600 includes a textual display area 610 related to displaying gasoline price data. As illustrated in FIG. 6, the textual display area 610 can include data 612 indicative of a lowest gasoline price and data 614 indicative of a highest gas price for a defined geographic region. In an illustrative embodiment of the present invention, the defined geographic region is an identifiable metro area, such as a city. Additionally, the textual display area 610 can include a link 616, such as a URL, for modifying the defined geographic area, such as a postal zip code. One skilled in the relevant art will appreciate that alternative gasoline price data selection and data display formats may be utilized in the screen display 600.

Figure 7:
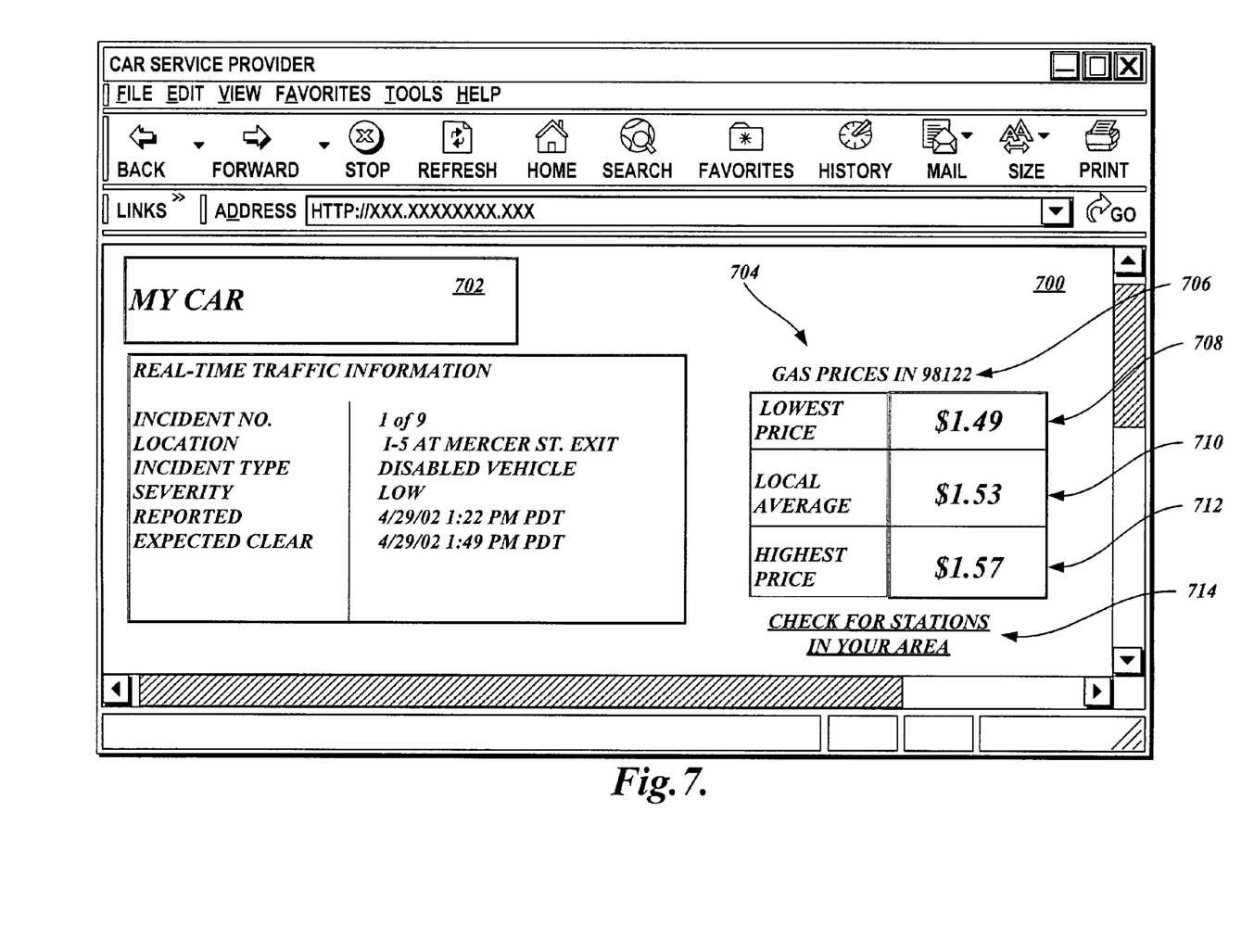
FIG. 7 is a block diagram illustrative of an exemplary screen display generated by a client computing device corresponding a geographic location-based gasoline price data display user interface formed in accordance with the present invention.

FIG. 7 is a block diagram illustrative of a screen display 700 generated by the gasoline price processing server 110 for display on a user device, such as a browser client 130, in accordance with the present invention. One skilled in the relevant art will appreciate that the screen display 700 is illustrative in nature and alternative screen displays may also be utilized in accordance with the present invention. Further, the screen display 700 may also be utilized in conjunction with other client devices.

The screen display 700 includes a service identification portion 702 that can be utilized to identify a personalized gasoline price information service providing the gasoline price data. The screen display 700 includes a textual display area 704 related to displaying gasoline price data. The textual display area 702 can include data 706 identifying the geographic area corresponding to the gasoline price data. As illustrated in FIG. 7, the defined geographic region is a postal zip code defined by a user. In an illustrative embodiment of the present invention, the textual display area 704 may also be manipulated to select a different defined geographic area, such as another postal zip code or an identifiable metro area. In another embodiment of the present invention, the textual display area 704 may also include an interface for allowing the user to select a proximity radius. The textual display area 704 can also include data 708 indicative of a lowest gasoline price, data 710 indicative of a local average gasoline price and data 712 indicative of a highest gasoline price for the defined geographic region 706. Additionally, the textual display area 702 can include a link 714, such as URL, for obtaining more detailed information regarding gasoline pricing and service stations in the defined geographic region. One skilled in the relevant art will appreciate that alternative gasoline price data selection and data display formats may be utilized in the screen display 700.

Figure 8A:
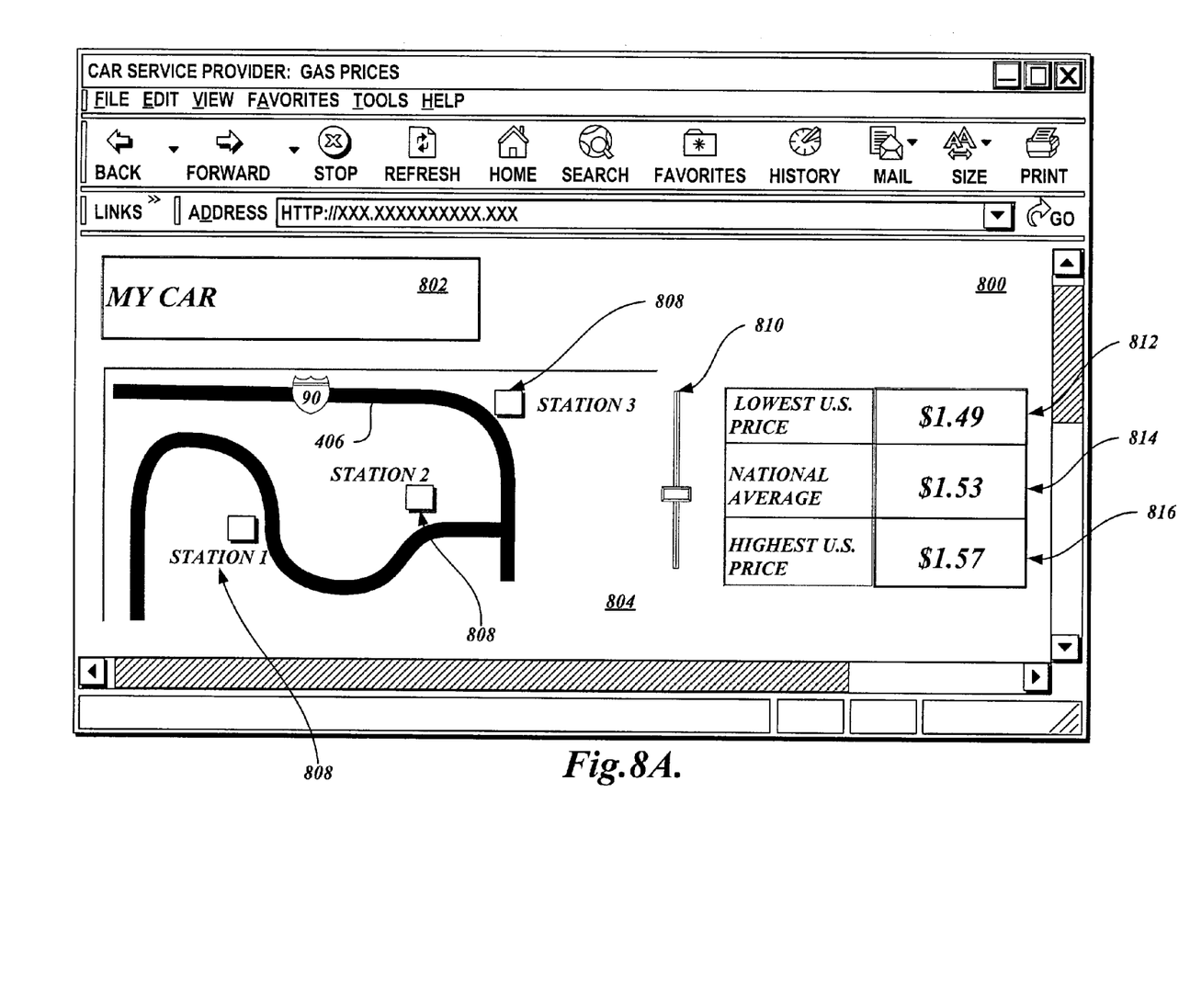
FIGS. 8A and 8B are block diagrams of an exemplary screen display generated by a client computing device corresponding to a geographic location-based gasoline price data display user interface formed in accordance with the present invention.
Figure 8B:
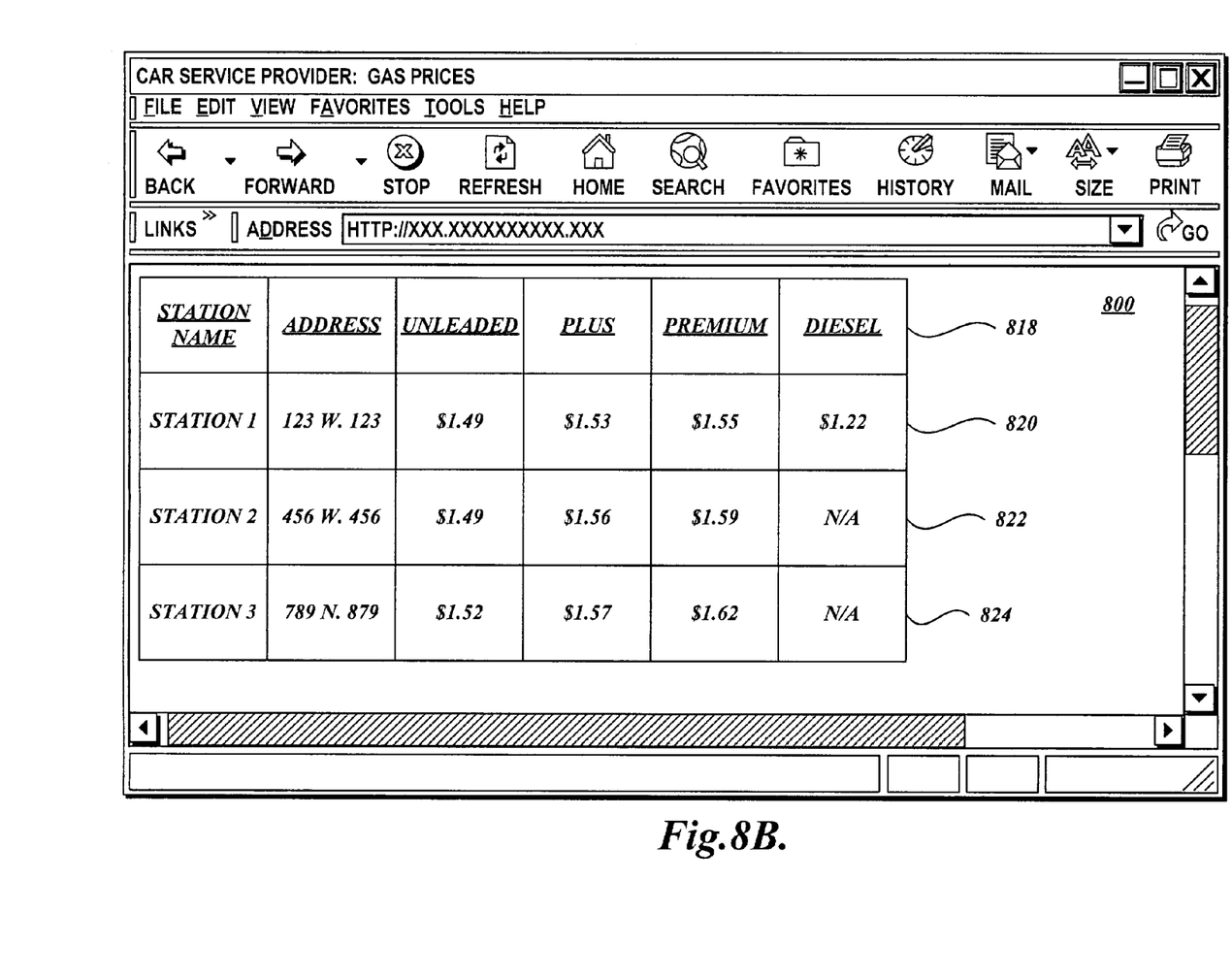

FIGS. 8A and 8B are block diagrams illustrative a screen display 800 generated by the gasoline price processing server 110 for display on a user device, such as a browser client 130, in accordance with the present invention. One skilled in the relevant art will appreciate that the screen display 800 is illustrative in nature and alternative screen displays may also be utilized in accordance with the present invention. Further, the screen display 800 may also be utilized in conjunction with other client devices.

With reference to FIG. 8A, the screen display 800 includes a service identification portion 802 that can be utilized to identify a personalized gasoline price information service providing the gasoline price data. The screen display 800 includes a graphical display area 804 for displaying a map display indicative of at least a portion of the selected geographic area. The graphic display area 804 can include an underlying map of the geographic area at a particular level of detail. The graphic display area 804 can also include graphical representations 808 of the relative geographic coordinates for any number of gasoline service stations within the geographic area. Each graphical representation may include a textual or graphical identifier of the gasoline service station. The screen display 800 may also include a zoom control 810 for adjusting the level of detail displayed in the graphical display area 804. The screen display 800 can also include data 812 indicative of a lowest gasoline price for the nation, data 814 indicative of an average gasoline price for the nation and data 816 indicative of a highest gasoline price for the nation. However, one skilled in the relevant art will appreciate that the selected data 812, 814, and 816 are illustrative and alternative gasoline price data selection and data display formats may be utilized in the screen display 800.

With reference now to FIG. 8B, the screen display 800 can also include a table 818 for displaying more detailed information regarding at least some of the gasoline service stations within the defined geographic region. The table 818 can include columns corresponding to the transaction data stream that can identify a station name, an address, and pricing information for a number of gasoline products. As illustrated in FIG. 8B, the table 818 includes three rows 820, 822, and 824 that correspond to the three graphical representations 808 displayed on the graphical display window 804 (FIG. 8A). As discussed above, the representation of gasoline service stations on the graphical display area 804 and within the table 818 may be based on system administrator and/or user display preferences.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for processing gasoline price data by a computer coupled to a communication network, the method comprising the computer implemented steps of:

obtaining, via the communication network, gasoline purchase transaction data from at least one consumer credit agency, said gasoline purchase transaction data corresponding to a plurality of consumer credit purchases of gasoline made by a plurality of consumers, each said consumer credit purchase being from an identifiable location, each said consumer credit purchase including a price charged per volume for the gasoline;

calculating geographic-specific gasoline price statistical information from the obtained gasoline purchase transaction data as a function of the identifiable location and the price charged per volume for the gasoline in the consumer credit purchases made by the plurality of consumers;

obtaining a user request for gasoline price data for a selected geographic region, wherein said user request indicates the selected geographic region;

generating a display including calculated gasoline price statistical information specific to the selected geographic region, wherein the identifiable location of the displayed gasoline price statistical information corresponds to the selected geographic region; and transmitting the generated display to the user.

2. The method as recited in claim 1, wherein the gasoline purchase transaction data includes data identifying a gasoline service station.

3. The method as recited in claim 1, wherein the gasoline purchase transaction data includes data identifying a gasoline type.

4. The method as recited in claim 1, wherein the gasoline purchase transaction data includes data indicative of multiple individual purchases of gasoline made by the plurality of consumers.

5. The method as recited in claim 1, wherein calculating geographic-specific gasoline price statistical information includes calculating an average gasoline price according to geographic criteria.

6. The method as recited in claim 1, wherein calculating geographic-specific gasoline price statistical information includes identifying a lowest and a highest gasoline price according to geographic criteria.

7. The method as recited in claim 1, wherein the identifiable location is associated with a postal zip code, and wherein said calculating includes calculating geographic-specific gasoline price statistical information from the obtained gasoline purchase transaction data as a function of the postal zip code associated with the identifiable location and the price charred per volume for the gasoline in the consumer credit purchases made by the plurality of consumers.

8. The method as recited in claim 1, wherein the identifiable location is associated with a metro area, and wherein said calculating includes calculating geographic-specific gasoline price statistical information from the obtained gasoline purchase transaction data as a function of the metro area associated with the identifiable location and the price charged per volume for the gasoline in the consumer credit purchases made by the plurality of consumers.

9. The method as recited in claim 1, wherein obtaining a user request for gasoline price data includes obtaining a user identification of a postal zip code for gasoline price data.

10. The method as recited in claim 1, wherein obtaining a user request for gasoline price data includes obtaining a user identification of an identifiable metro area.

11. The method as recited in claim 1, wherein obtaining a user request for gasoline price data includes obtaining a calculated geographic position for a user.

12. The method as recited in claim 1, wherein obtaining a user request for gasoline price data includes determining a proximity radius for gasoline service stations within the selected geographic region.

13. The method as recited in claim 12, wherein determining a proximity radius includes obtaining a user specification of a proximity radius.

14. The method as recited in claim 1, wherein obtaining a user request for gasoline price data includes obtaining a user request for gasoline price data for multiple selected geographic regions.

15. The method as recited in claim 14, wherein the multiple geographic regions are selected to correspond to a specified navigable rome.

16. The method as recited in claim 1, further comprising: obtaining a user request for additional gasoline price information; generating a second display corresponding to the specified geographic region; transmitting the second display to the user.

17. The method as recited in claim 16, wherein the second display includes a map corresponding to the specified geographic region, the map including geographic identifiers for gasoline service providers within the specified geographic region.

18. The method as recited in claim 16, wherein the second display includes information corresponding to gasoline prices for gasoline service providers with an area corresponding to the specified geographic region.

19. The method as recited in claim 18, wherein the information corresponding to gasoline prices for gasoline service providers includes average gasoline prices for a gasoline type.

20. The method as recited in claim 16, wherein the second display includes gasoline prices for a geographic region different from the specified geographic region.

21. The method as recited in claim 1, wherein said calculating includes verifying the identifiable location, and if the identifiable location cannot be verified, discarding the gasoline purchase transaction data.

22. The method as recited in claim 21, wherein verifying the identifiable location includes obtaining latitudinal and longitudinal coordinates corresponding to the identifiable location.

23. The method of claim 15, wherein the specified navigable route is specified via user input.

24. The method of claim 15, wherein the specified navigable route is specified via a user request originating from a mapping application program.

* * * * *

UNITED STATES PATENT AND TRADEMARK OFFICE
CERTIFICATE OF CORRECTION

PATENT NO. : 7,617,111 B1
APPLICATION NO. : 10/187079
DATED : November 10, 2009
INVENTOR(S) : Sheppard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Nineteenth Day of October, 2010

David J. Kappos
*Director of the United States Patent and Trademark Office*